US012692406B2

(12) United States Patent (10) Patent No.: US 12,692,406 B2

Ojala et al. (45) Date of Patent: Jul. 28, 2026

(54) RUBBER-BASED ARTICLE WITH LOW FLUID PERMEABILITY

(71) Applicant: Nokian Renkaat Oyj, Nokia (FI)

(72) Inventors: Anne Ojala, Nokia (FI); Noora Kemppainen, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 402 days.

(21) Appl. No.: 17/684,636

(22) Filed: Mar. 2, 2022

(65) Prior Publication Data

US 2022/0411657 A1 Dec. 29, 2022

(51) Int. Cl.
| | |
|---|---|
| *C09D 111/00* | (2006.01) |
| *B60C 1/00* | (2006.01) |
| *C09D 107/00* | (2006.01) |
| *C09D 109/02* | (2006.01) |
| *C09D 115/02* | (2006.01) |
| *C09D 123/16* | (2006.01) |

(52) U.S. Cl.
CPC .......... *C09D 111/00* (2013.01); *B60C 1/0008* (2013.01); *C09D 107/00* (2013.01); *C09D 109/02* (2013.01); *C09D 115/02* (2013.01); *C09D 123/16* (2013.01)

(58) Field of Classification Search
CPC .............................. B60C 1/0008; C08L 97/005
See application file for complete search history.

(56) References Cited

U.S. PATENT DOCUMENTS

| | | | |
|---|---|---|---|
| 2003/0122661 A1* | 7/2003 | Ginman .............. | B60C 23/0408 340/447 |
| 2018/0334568 A1* | 11/2018 | Lahtinen ................. | C08H 6/00 |
| 2018/0340074 A1 | 11/2018 | Wittmann et al. | |
| 2019/0284375 A1 | 9/2019 | Lahtinen et al. | |
| 2020/0239697 A1* | 7/2020 | Wittmann ................. | C09C 1/48 |

FOREIGN PATENT DOCUMENTS

| | | | | |
|---|---|---|---|---|
| EA | 30702 | B1 | 9/2018 | |
| JP | 3601569 | B2 * | 12/2004 | .............. C08J 3/005 |
| KR | 20190091159 | A | 8/2019 | |
| KR | 20210029897 | A | 3/2021 | |

(Continued)

OTHER PUBLICATIONS

Machine translation JP 3601569B2 (Year: 2025).*

(Continued)

*Primary Examiner* — Alexandre F Ferre

(74) *Attorney, Agent, or Firm* — Merchant & Gould P.C.

(57) ABSTRACT

An article is not pneumatic tyre for a motor vehicle and the article's use are that is suitable as at least a part of a pressurizable container or pipeline. The article includes a first side that is, in use, configured to be exposed to a first environment and a second side that is, in use, configured to be exposed to a second environment. At least a part of the article includes rubber-based material that is configured to restrict fluid permeability and that includes lignin that has been treated by hydrothermal carbonization. The rubber-based material or a coating of the rubber-based material forms at least a part of the first side, and the first side is, in use, configured to be exposed to a higher pressure than the second side. A method is for manufacturing the article.

16 Claims, 8 Drawing Sheets

(56) References Cited

FOREIGN PATENT DOCUMENTS

| | | | |
|---|---|---|---|
| RU | 2715537 | C1 | 2/2020 |
| SU | 726127 | A1 | 5/1980 |
| SU | 1049507 | A1 | 10/1983 |
| WO | 2014012924 | A1 | 1/2014 |
| WO | 2017194346 | A1 | 11/2017 |
| WO | 2020/202125 | A1 | 10/2020 |

OTHER PUBLICATIONS

Machine translation KR20190091159 (Year: 2025).*
Finnish Office Action for FI Application No. 20215306 mailed Sep. 20, 2021 (7 pages).
Tire RFID Standard Expected by End of 2019, Rubber News, [online], 2018, European Rubber Journal Report, [retrieved on Sep. 17, 2021]. Retrieved from https://www.rubbernews.com/article/20181019/NEWS/181019931/tire-rfid-standard-expected-by-end-of-2019.
Extended European Search Report for EP Application No. 22159331.2 mailed Aug. 2, 2022 (6 pages).
Russian Notice of Allowance received for RU Application No. 2022106534/05 on Oct. 9, 2025, 28 pgs.
Russian Office Action received for RU Application No. 2022106534/05(03538) on May 12, 2025, 12 pgs.

* cited by examiner

RUBBER-BASED ARTICLE WITH LOW FLUID PERMEABILITY

CROSS-REFERENCE TO RELATED APPLICATIONS

This application claims priority benefit of Serial No. 20215306, filed Mar. 19, 2021 in Finland, and which application is incorporated herein by reference. To the extent appropriate, a claim of priority is made to the above-disclosed application.

FIELD OF THE INVENTION

The invention relates to additive material materials as a part of a rubber-based material for the purpose of restricting fluid permeability. In other terms, the invention relates to articles suitable for use as at least a part of a pressurizable container or pipeline, the article comprising rubber-based material and an additive material. The invention relates to use of such articles such that a pressure difference exits between sides of the article. In particular, the article may be suitable for use as at least a part of a pressurizable container or pipeline, and other than a pneumatic tyre for a motor vehicle. The invention relates a method for manufacturing such an article.

BACKGROUND

Articles formed of rubber-based material are commonly used in containers or pipelines, the articles thus forming at least a part of such a container or a pipeline. Examples of such articles include pipes, tubes, hoses, sealing rings, pneumatic tyres (tubeless and/or inner tyres), containers, such inflatable containers, vessels, and parts of any one of these.

A purpose of the rubber-based material in such articles is to restrict fluid permeability of the container or the pipeline. Herein the term "fluid" refers to liquid or gaseous fluid.

Because of purpose of the material, a low fluid permeability is required. Fluid permeability can be affected by mixing some additive material or additive materials with a rubber-based matrix material to form a rubber-based material comprising the additive material.

However, depending on the type of the additive, even if permeability can be lowered, some other properties (e.g. ductility) may be lost. Therefore, some additives may deteriorate other properties of the rubber-based material, whereby they are, in practice, not usable, or usable only to a small extent.

A problem in such articles is to find a rubber-based material that has a decreased fluid permeability at the same time the other properties are not compromised.

SUMMARY

The inventors have found that lignin that has been treated by hydrothermal carbonization (hereinafter HTC-lignin) is capable of decreasing fluid permeability of many rubber-based materials. In particular, the inventors have found that lignin that has been treated by hydrothermal carbonization (i.e. HTC-lignin) is capable of decreasing air permeability of many rubber-based materials. HTC-lignin can be mixed with a rubber-based matrix material to form rubber-based material that is configured to restrict fluid permeability and that comprises HTC-lignin. An article that is suitable for such a use may be e.g. one of the following: a part of a chamber (e.g. of a machine), a chamber, a part of a container (e.g. pressurizable container), a container (e.g. pressurizable), a part of a pressurizable pipeline, or pressurizable pipeline. Moreover, the rubber-based material comprising the HTC-lignin forms, or is arranged close to, at least a part of at least such a side of the article that is, in use, configured to be exposed to a higher pressure than another side of the article. Thus, the fluid does not penetrate the article. However, the article may be made of the same material throughout. In use, the sides of the article/tyre are exposed to fluid environments having different pressures. The description including numbered examples includes embodiments and examples not falling within the scope of claims but are considered useful for understanding the invention. Claims cover also further solutions not explicitly disclosed in the description.

DETAILED DESCRIPTION

Figure 1A:
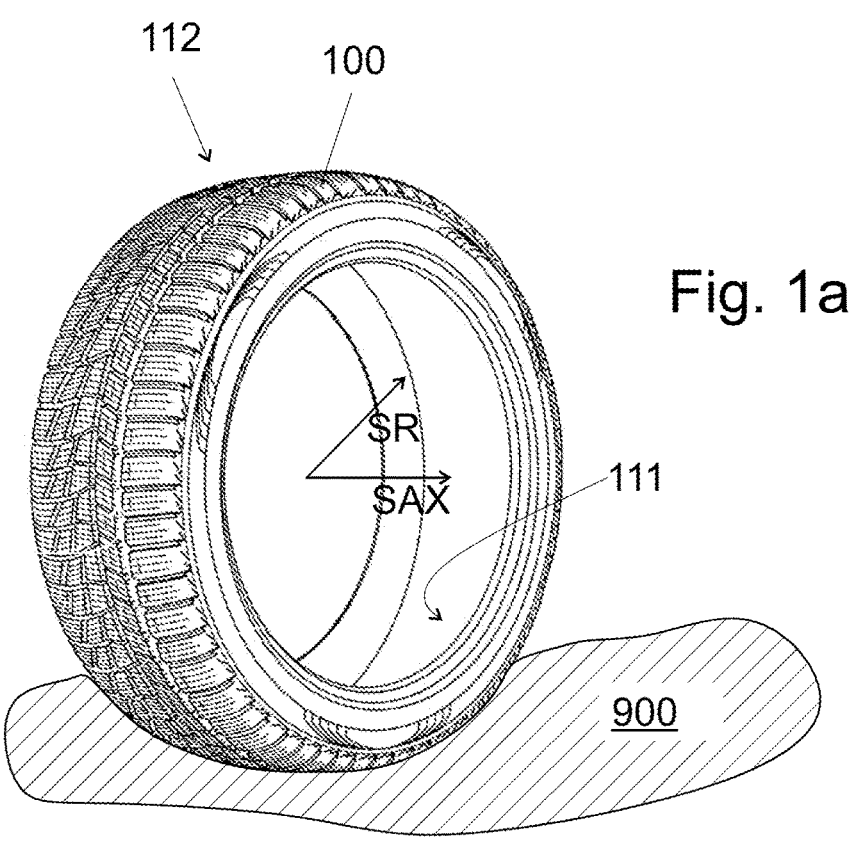
FIG. 1a illustrates a tubeless pneumatic tyre for a motor vehicle in a perspective view.

Articles formed of rubber-based material are commonly used in chambers, containers, or pipelines, the articles thus forming at least a part of such a container, chamber, or a pipeline. Examples of such articles (100, 200, 300, 400, 900) include tubeless pneumatic tyres 100 for a motor vehicle, shown in FIGS. 1a to 1d, inner tyres 200 for vehicles (motorized or non-motorized), shown in FIGS. 2a and 2b, which inner tyres are also examples of pneumatic tyres. Examples of such articles (100, 200, 300, 400, 900) further include other chambers and/or containers 900, as depicted in FIG. 3, pipes, tubes, hoses, generally shown by reference 300 in FIGS. 4a and 4b, and sealing rings 400, shown in FIGS. 5a and 5b. The present invention relates to articles other than pneumatic tyres for motor vehicles, to uses of such an article, and to a method for manufacturing such an article.

Common to all these articles 100, 200, 300, 400, 900 is that the article 100, 200, 300, 400, 900 comprises a first side 111, 211, 311, 411, 911 and a second side 112, 212, 312, 412, 912. The first side is, in use, configured to be exposed to a first environment ENV1 and the second side is, in use, configured to be exposed to a second environment ENV2. Moreover, in use, the first side is, in use, configured to be exposed to a higher pressure than the second side. In particular, the surface formed by the first side 111, 211, 311, 411, 911, or a coating (136, 137, 237, 937, 337) of the first side, is, in use, configured to be exposed to the first environment ENV1. The coating, if any, is relatively thin, as discussed below.

Because of this pressure difference, low fluid permeability is required from such articles. The term "fluid" refers to liquid or gaseous fluid, or a mixture of a gas (vapor) and a liquid, or a substance in a supercritical stage. However, as well known, the state of the material depends on temperature and pressure. Thus, the term "fluid" refers to such material that is in the liquid and/or gaseous state or in the supercritical state at temperature 0° C. and pressure 1 bar. In particular, the term "fluid" relates to gaseous material at this temperature and pressure.

As indicated above, the inventors have found that lignin that has been treated by hydrothermal carbonization (hereinafter HTC-lignin) is capable of decreasing fluid permeability of many rubber-based materials. Reference is made to the section "Experimental" below. Because the results show this effect for a wide variety of rubber materials and a wide variety of HTC-content, the inventors consider that this effect is universal for a large variety of rubber materials.

As readable from above, the inventors have found that lignin that has been treated by hydrothermal carbonization (hereinafter HTC-lignin) is capable of decreasing fluid permeability of many rubber-based materials without compromising with other properties of the rubber-based material. In particular, the inventors have found that HTC-lignin is capable of decreasing air permeability of many rubber-based materials. In general, this may be due to structure of HTC-lignin, the structure being a polymer. Most likely the HTC-lignin forms, in the rubber matrix, a polymer network that resists fluid permeation. In contrast, traditional fillers do not form such a polymer network. Furthermore, HTC-lignin comprises relatively high amounts of functional groups. It seems that these functional groups may participate in chemical reactions and form chemical bonds with halogens of the rubber matrix so as to improve air tightness. At least halogenated butyl rubber comprises such halogen atoms, and as detailed below, their air tightness has been observed to be extremely good.

Therefore, the article 100, 200, 300, 400, 900 comprises first rubber-based material that is configured to restrict fluid permeability. In addition, the first rubber-based material comprises lignin that has been treated by hydrothermal carbonization (i.e. HTC-lignin). In particular, at least a part of the article comprises the first rubber-based material such that the first rubber-based material or a coating thereof forms at least a part of the first side 111, 211, 311, 411, 911. The article may comprise also a second rubber-based material. However, when considered feasible, the first rubber based material will be simply referred to as the rubber based material. The second rubber-based material, if present, need not comprise, but may comprise, HTC-lignin.

In general, the coating of the first rubber-based, if even present, is thin. A thickness of the coating may be e.g. at most 5 mm, at most 1 mm, or at most 500 µm. In some cases, the coating may be thicker. Examples will follow.

Because of the HTC-lignin, the fluid permeability of the article 100, 200, 300, 400, 900 is reduced. Moreover, the rubber-based material comprising the HTC-lignin has been applied at least close to that side of the article 100, 200, 300, 400, 900 that is exposed to a high pressure in use, i.e., close to the first side 111, 211, 311, 411, 911. Therefore, penetration of the fluid to the article and through the article is effectively prevented. Since the article may comprise the coating in between the first environment ENV1 and the first rubber-based material, the fluid may penetrate the coating. However, because the coating is thin, this does not affect the properties of the article.

Even if the present invention relates to articles other than pneumatic tyre for motor vehicles (and their use and manufacture), the function of HTC-lignin in a pneumatic tyre is considered to help the reader to understand the invention.

FIG. 1a, shows a tubeless tyre 100 for a motor vehicle, which is an example of a pneumatic tyre. The tyre may be e.g. a passenger car tyre. When applied on a wheelrim, the wheelrim and the tubeless pneumatic tyre 100, in combination, form a container for pressurized gas, such as air or nitrogen, typically air.

Referring to FIG. 1a, the tubeless pneumatic tyre 100 has a first side 111, i.e. an inner side of the tyre 100. The tubeless pneumatic tyre 100 has an opposite second side 112, which is an outer side of the tyre 100 and in this case forms a tread of the tyre. It is noted that an inner tyre does not form a tread. The tubeless pneumatic tyre 100 is configured to rotate about an axis of rotation SAX. When in use, the tread of the tubeless pneumatic tyre 100 is configured to be in a rolling contact with a base 900, such as ground surface, road, or a path. A tubeless pneumatic tyre in this context refers to a radial tyre used on a motor driven vehicle. Typical examples of tubeless pneumatic tyres are passenger car, SUV-, VAN-, bus and/or truck tyres. Tubeless pneumatic tyres, referred to as heavy tyres, may also be used in mining, harbour and forestry applications. A pneumatic tyre needs not be tube-less. Inner tyres will be discussed below.

Figure 1B:
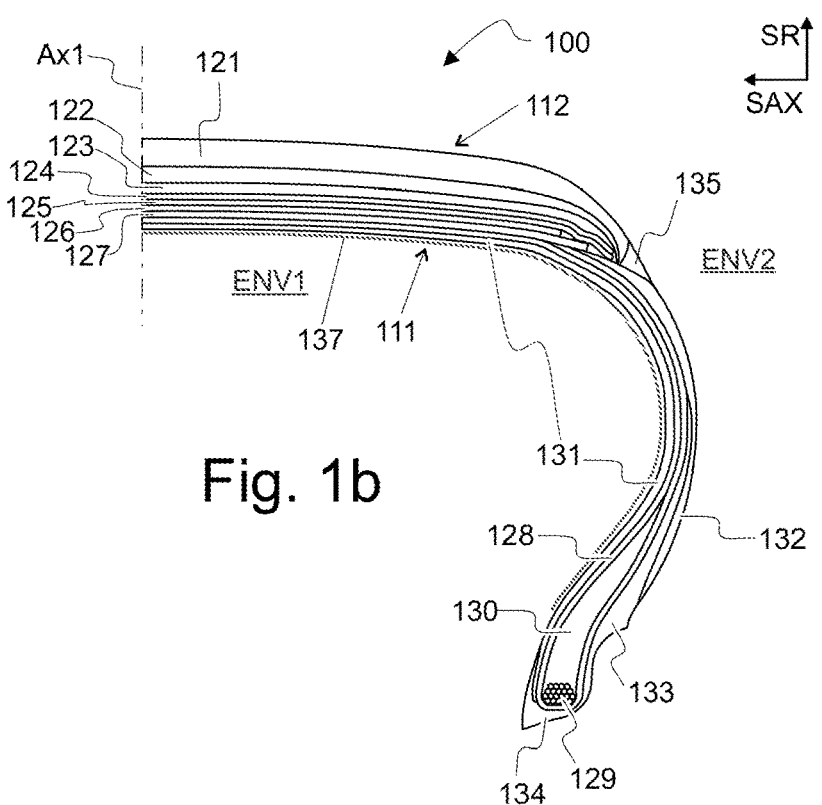
FIG. 1b illustrates a quarter of a cross-section of a tubeless pneumatic tyre for a motor vehicle, an inner side of the pneumatic tyre comprising rubber-based material comprising HTC-lignin, the inner side being formed by an innerliner, which may have been covered by inside tyre paint.

FIG. 1*b* illustrates a quarter of a cross-section of a tubeless pneumatic tyre 100. The tubeless pneumatic tyre 100 may be symmetric about the axis Ax1 of FIG. 1*b*. FIG. 1*b* shows a cross section of a "top" of a tyre, but for clarity does not show a cross section of a "bottom" of the tyre, which would be substantially symmetric with the "top" of the tyre.

A tubeless pneumatic tyre 100 for a vehicle comprises multiple components shown by the references 121 to 135. The tyre 100 comprises a variety of materials, such as metal, textile and multiple types of rubber-based components. In general, a pneumatic tyre 100 may comprise one or more layers of reinforcing textile or textiles, such as polyester and/or nylon for a ply 128, as well as nylon belts 124, 125. The pneumatic tyre TYR1 may comprise one or more metal components for reinforcement purposes, such as resilient steel belts 126, 127 and bead cable 129. The reinforcing material (128, 124, 125) is arranged such that at least some of the rubber-based material that comprises lignin that has been treated by hydrothermal carbonization is arranged between the inner side of the pneumatic tyre and the reinforcing material. As the reinforcing material e.g. a fibrous material, a textile, or a metal may be used.

The exterior of the tyre is called a tyre carcass, referring to a thick profile surrounding the tyre. Tread area compo-nents of the tyre carcass provide an interface between the tyre 100 and the road (e.g. 900). In general, hard tread area components may provide less wear and reduce the rolling resistance of the tyre. Soft tread area components may provide better traction. The rubber-based components of the tread area may comprise components such as tread 121, tread base 122, undertread 123 and shoulder 135. The tread has a tread pattern affecting noise, handling, traction and/or wear of the tyre 100. The tread 121 may comprise additional structural elements, such as metal studs.

In addition to tread area components, the pneumatic tyre 100 comprises a sidewall 132. The sidewall is typically configured to withstand flexing and provide protection for the ply 128. A bead area of the tyre 100 may comprise, for example, a clinch 133, an apex 130 and bead base 134. Clinch 133 enables a proper seating of the bead base 134 to a rim flange, thereby enabling a tight sealing of the tyre with the wheelrim.

The pneumatic tyre 100 of FIG. 1*b* comprises an inner-liner 131. Innerliner 131 refers to a layer or layers of rubber or rubber-based components. When in use, the space between the innerliner 131 and the wheelrim can be filled with compressed air and/or other gas, e.g. nitrogen. Thus, a function of the innerliner 131 is to resist air or gas diffusion, or, in other words, decrease air or gas permeability of the tyre 100. Thus, in a preferable embodiment, the article is a pneumatic tyre 100, 200. More preferably, the pneumatic tyre comprises an innerliner 131, and the innerliner 131 comprises the rubber-based material comprising HTC-lignin. Even if an innerliner 131 is shown only in the context of a tubeless pneumatic tyre 100, an innerliner can be used also in an inner tyre 200, which is discussed later.

In FIG. 1*b*, the innerliner 131, or an inside tyre paint 137 forms the first side 111 (i.e. the inner side) of the tubeless pneumatic tyre). For manufacturing reasons, the innerliner 131 may be covered with inside tyre paint 137. A thickness of a layer of the inside tyre paint may be e.g. at most 500 μm. A conventional inside tyre paint is water-based and contains filler(s). The inside tyre paint may comprise a wax disper-sion. The inside tyre paint may comprise rubber latex. As a filler material, a mica and/or a silicate may be used. In addition, the inside tyre paint may comprise a siloxane or siloxanes, such as polydimethylsiloxane. Even if inside tyre paint is used during manufacturing, it may be removed after removing the tyre from the bladder. Thus, the innerliner needs not be coated with inside tyre paint. As will be detailed below, the innerliner 131 (or the inside tyre paint 137, as the case may be), may be further coated with self-sealing material 136. A thickness of the self-sealing material layer may be e.g. up to 5 mm. The self-sealing material may comprise, but need not comprise, HTC-lignin. Thus, a thickness of the coating of the first rubber-based material, if even present, may be eg. at most 5 mm.

As depicted in FIG. 1*b*, the innerliner 131, or a coating thereof (i.e. the inside tyre paint 137), is configured to be exposed to the first environment ENV1. Herein the first environment refers to the environment inside the tyre, in particular when used on a wheelrim and inflated. An outer side (i.e. the second side 112) of the tyre is exposed to a second environment ENV2, such as atmosphere. In this embodiment, a pressure difference between the first and the second environments ENV1, ENV2 may be at least 1 bar, typically around 2 bar or more, e.g. up to 7 bar. The material of the innerliner 131 may be cured, i.e. hardened. As well known, in general, rubber-based materials may be cured or uncured.

The innerliner 131 may comprise butyl rubber that com-prises HTC-lignin. As will be detailed below, HTC-lignin has been observed to decrease air permeability of butyl rubber, the term "butyl rubber" including also halobutyl rubbers, significantly. Moreover, butyl rubbers also naturally have relatively low air permeability, which makes them suitable candidates for various applications (also other than tyres) requiring air tightness.

As indicated above, the material of the innerliner 131 can be called the first rubber-based material. The tread 121 may be optimized for other purposes than the innerliner 131. Such other purposes include traction (characterized by a coefficient of friction), avoiding noise (characterized by a noise production), avoiding wear (characterized by a wear resistance), enabling rolling (characterized by a rolling resis-tance), and strengthening (characterized e.g. by a modulus). Typically, such properties are best achieved with a different material composition than that of the innerliner 131. Thus, in an embodiment, the tread 121 comprises second rubber-based material, wherein the second rubber-based material is different from the first rubber-based material of the inner-liner 131. However, the second rubber-based material may also comprise HTC-lignin but be different in some other way (e.g. amount of HTC-lignin, and/or type of the rubber-based matrix material). The second rubber-based material need not comprise HTC-lignin. The second material may be a rubber-based material comprising suitable filler, such as carbon black, silica, and/or HTC-lignin.

Figure 1C:
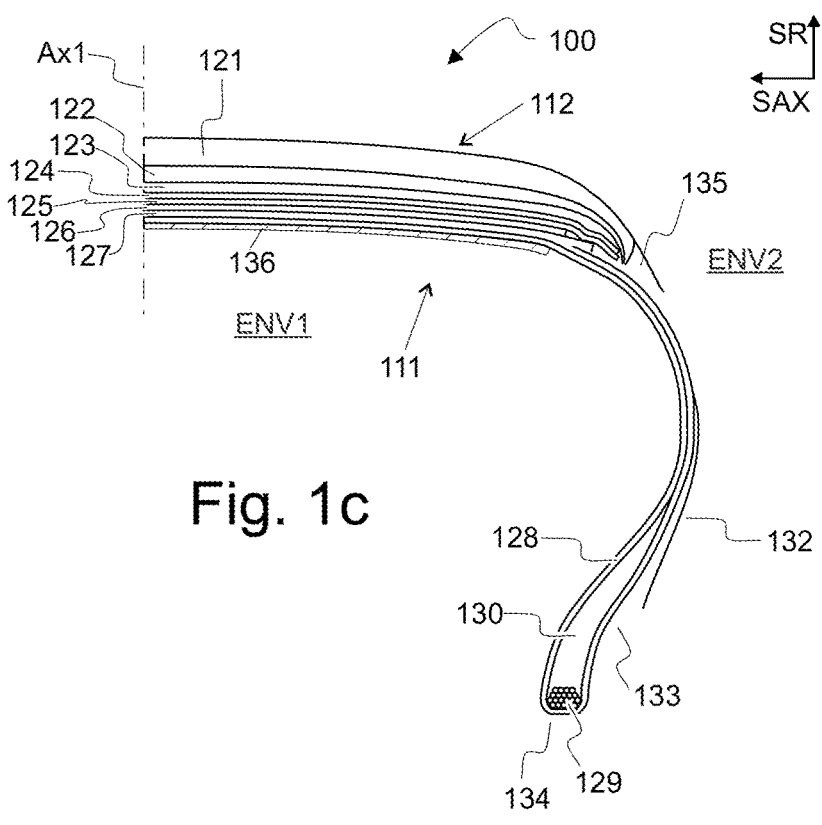
FIG. 1c illustrates a quarter of a cross-section of a tubeless pneumatic tyre, an inner side of the pneumatic tyre comprising rubber-based material comprising HTC-lignin, a part of the inner side being provided with self-sealant material.
Figure 1D:
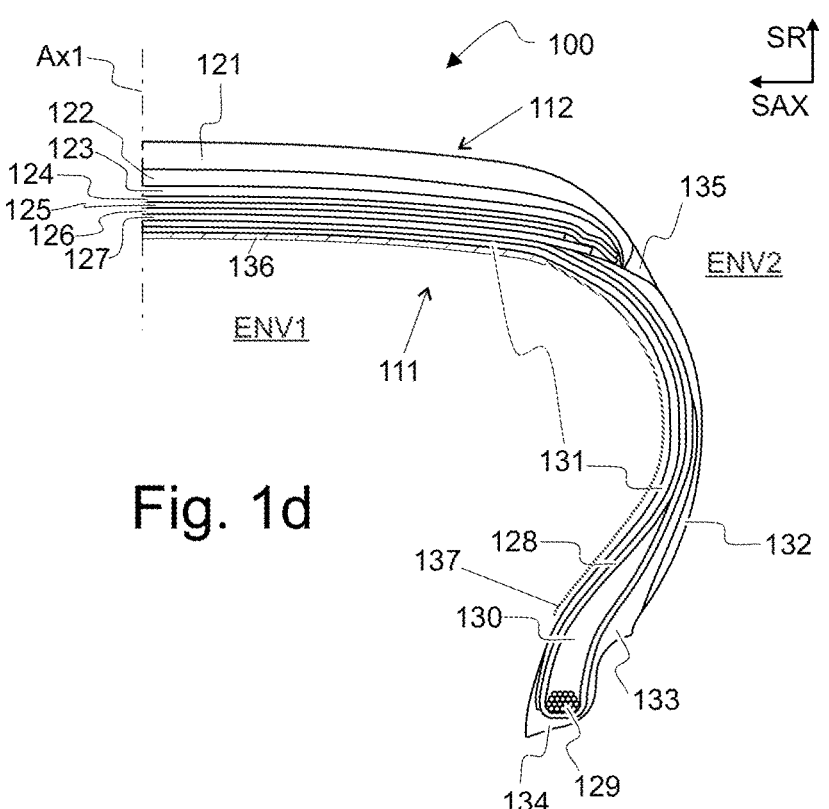
FIG. 1d illustrates a quarter of a cross-section of a tubeless pneumatic tyre, an inner side of the pneumatic tyre comprising rubber-based material comprising HTC-lignin, the pneumatic tyre comprising an innerliner, wherein a part of the inner side is provided with self-sealant material.

Referring now to FIG. 1*c*, the tubeless pneumatic tyre 100 may be provided with self-sealant material 136. In such a case, the self-sealant material 136 forms a part of the first side 111 (i.e. the inner side) of the tubeless pneumatic tyre 100. The tubeless pneumatic tyre 100 needs not comprise an innerliner 131, as shown in FIG. 1*c*. However, the tubeless pneumatic tyre 100 preferably comprises an innerliner 131, as shown in FIGS. 1*b* and 1*d*. It may comprise self-sealant 136, as shown in FIGS. 1*c* and 1*d*. The pneumatic tyre may comprise both an innerliner 131 and self-sealant 136 as shown in FIG. 1*d*. A layer of inside tyre paint may be provided in between the innerliner and the self-sealant. Even if self-sealant 136 is shown only in the context of a tubeless pneumatic tyre 100, self-sealant material 136 can be used also in an inner tyre 200, which is discussed later. The self-sealant may comprise butyl rubber, e.g. halobutyl rubber.

The self-sealant material 136 is typically uncured in order for the self-sealant to be able to penetrate and fix punctures of the tyre. As the function of self-sealant is to prevent gas leakage, the self-sealant material 136 may comprise the rubber-based material comprising HTC-lignin. In a tyre comprising both the innerliner 131 and self-sealant material 136, preferably at least one of them comprises rubber-based material comprising HTC-lignin. When both comprise rubber-based material comprising HTC lignin, they need not comprise the same material. In particular, the innerliner 131 may be cured, and the self-sealant 136 may be uncured. Clearly, the tread 121 may be comprise different material than the self-sealant 136 and different material than the innerliner 131. Thus, the material of the self-sealant may be referred to as a third material that is rubber-based.

Referring to FIG. 1*d*, the innerliner 131 (or the inside tyre paint as the case may be) may form only a part of the first side 111, and the self-sealant 136 may form the rest of the first side 111. In such a case, the innerliner may comprise the first rubber-based material and the self-sealant 136 may comprise some other rubber-based material comprising lignin that has been treated by hydrothermal carbonization.

A pneumatic tire may be provided with noise cancelling foam (not shown). Noise cancelling foam, if used, is typically applied on some parts of the inner side of the pneumatic tire. A thickness of the noise cancelling foam is typically of the order of some centimetres, such as 2 cm to 4 cm. However, most often at least some parts of the inner surface are free from noise cancelling foam. Also in this case, the rubber-based material or a coating of the rubber-based material forms at least a part of the first side of the pneumatic tyre. In the alternative, the noise cancelling foam may be seen as a coating. If the foam would fully cover the inner side of the tyre, it would form the coating, and a thickness of the coating could be large (e.g. up to some centimetres).

Even if not shown in FIGS. 1*a* to 1*d*, when used, the tubeless pneumatic tyre may be filled through a valve. A valve typically penetrates an aperture of the wheelrim. A valve needs not be part of the tubeless pneumatic tyre or the wheelrim.

A method for manufacturing a pneumatic tyre for a vehicle comprises manufacturing a preform of a pneumatic tyre, which is then cured. Curing the preform of a pneumatic tyre bonds the components together by means of curing. The preform of the pneumatic tyre is manufactured by arranging metal components and textile components to a carcass of a tire. The carcass of the tire is manufactured by arranging materials, i.e. at least a rubber-based component, onto a building drum to form a tubular preform and by expanding the tubular preform. When the tubular preform is expanded, the carcass of the pneumatic tyre is obtained. Reference is made, with respect to manufacturing a pneumatic tyre and its composition, to the publication "The Pneumatic Tyre" (publication by the U.S. Department of Transportation, National Highway Traffic Safety Administration, February 2006) in particular to Chapter 1, Section 5 ("An Overview of Tire Technology—Tire manufacturing") and Chapter 2, Section 1 ("Mechanical Properties of Rubber—Elasticity and visco-elasticity"). Said sections describe common compositions and components of a pneumatic tyre as well as steps for assembling and curing a pneumatic tyre.

When manufacturing a pneumatic tyre for a vehicle configured to restrict gas permeability, the method comprises receiving rubber-based material that has been formed by mixing lignin that has been treated by hydrothermal carbonization and rubber-based matrix material for restricting gas permeability of the rubber-based material.

The rubber-based component, which is arranged onto the building drum, may comprise the rubber-based material that is for restricting gas permeability. Thus, the method may comprise arranging the rubber-based material onto the building drum before said expanding the tubular preform to form a carcass of the pneumatic tyre. For example, an innerliner may be so arranged. In the alternative, the innerliner may be applied onto the tire after the curing. In the alternative or in addition, the rubber-based material may be arranged onto an inner surface of the carcass. For example, a self-sealant may be so arranged. The self-sealant may be applied after the preform has been cured. The rubber-based material may be arranged onto an inner surface of the carcass during the curing.

If the preform of the tire comprises an innerliner, a surface of the innerliner may be provided with inside tire paint in order to ease the removal of the tyre preform from a mould, in which the preform is cured. The tire inside paint may serve as the coating of the rubber-based material.

The preform of the tire may be cured at a temperature of 150° C. to 200° C.

An embodiment comprises receiving or forming an innerliner comprising the rubber-based material. Then the innerliner may be arranged onto the building drum before said expanding the tubular preform to form a carcass of the pneumatic tyre. In the alternative, the innerliner may be arranged onto an inner surface of the carcass. The innerliner may be received in a finished and cured form, e.g. it may be bought. The material for the innerliner may be formed e.g. my mixing the HTC-lignin with the matrix material. The uncured material for the innerliner may be bought. Uncured innerliner material may be arranged on the building drum before said expanding or after the expanding but before curing the preform. The rubber-based material, e.g. an innerliner, may be arranged onto the building drum before said expanding such that the rubber-based material forms a radially innermost layer of the materials arranged on the building drum. Other material layers, e.g. plies of the carcass, may be arranged on the innerliner.

An embodiment comprises applying the rubber-based material onto the inner surface of the carcass after said curing for using the rubber-based material as a self-sealant. If another part of the tyre comprises the rubber-based material, a self-sealant that is not rubber-based and/or does not comprise HTC-lignin may be used.

What has been said about the rubber-based material in the context of the tire, in particular the rubber part of the material, applies in the context of the method, particularly to the rubber-based matrix material.

The rubber-based material may be received in a finished form (cured or uncured), e.g. it may be bought. The rubber-based material may be formed e.g. by mixing the HTC-lignin with the matrix material. Thus, an embodiment comprises providing the lignin that has been treated by hydrothermal carbonization and providing the rubber-based matrix material. Thereafter, the rubber-based material (e.g. an innerliner and/or a self-sealant) is formed by mixing the lignin that has been treated by hydrothermal carbonization with the rubber-based matrix material for restricting gas permeability of the rubber-based material.

In an embodiment, a specific surface area of the lignin that has been treated by hydrothermal carbonization and that is mixed with the rubber-matrix material is in the range of 7 $m^2/g$ to 150 $m^2/g$, when measured according to ASTM D-6556-10. In an embodiment, an oil absorption number of the lignin that has been treated by hydrothermal carbonization and that is mixed with the rubber-matrix material is the range of 50 ml/100 g to 130 ml/100 g, when measured according to ASTM D2414-09. As an alternative to mixing, a finished rubber-based material may be received. These preferable properties of the HTC-lignin apply also in such a case.

Figure 2A:
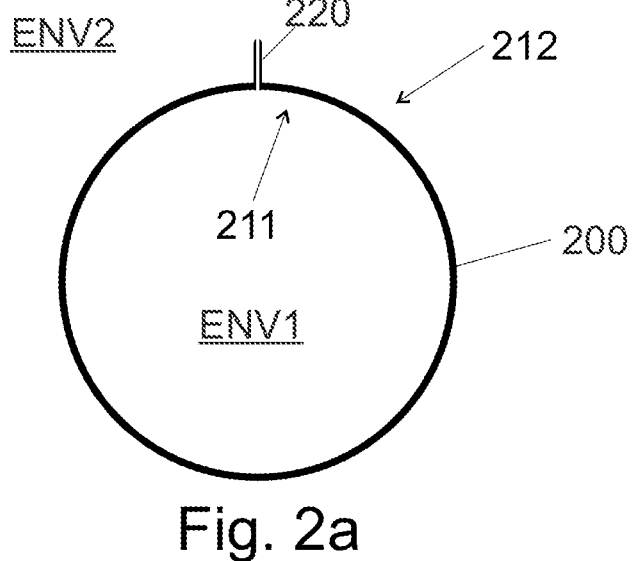
FIG. 2a illustrates a cross-section of an inner tyre, which is a pneumatic tyre, an inner and an outer side of the pneumatic tyre comprising rubber-based material comprising HTC-lignin.
Figure 2B:
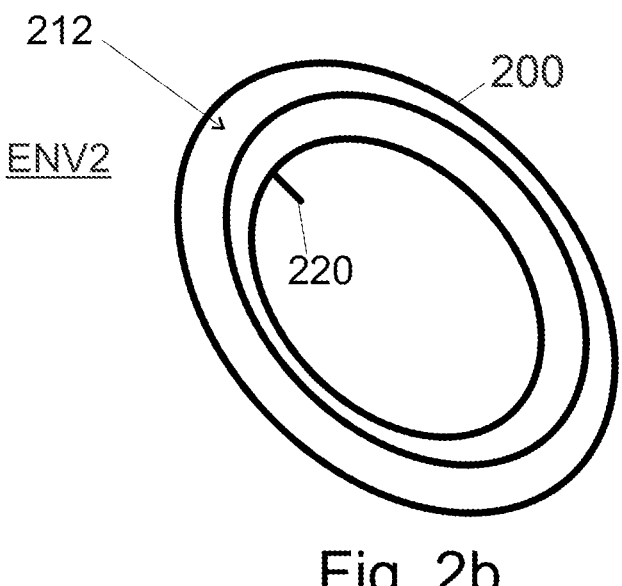
FIG. 2b illustrates an inner tyre in a perspective view.
Figure 2C:
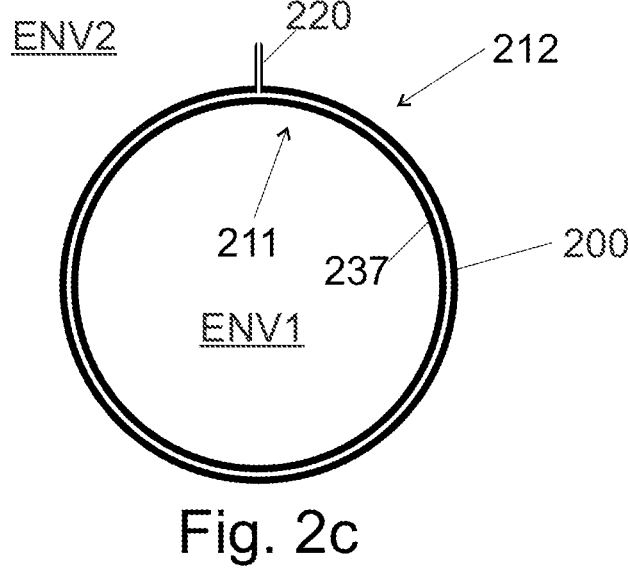
FIG. 2c illustrates a cross-section of an inner tyre comprising a coating on its inner side.
Figure 3:
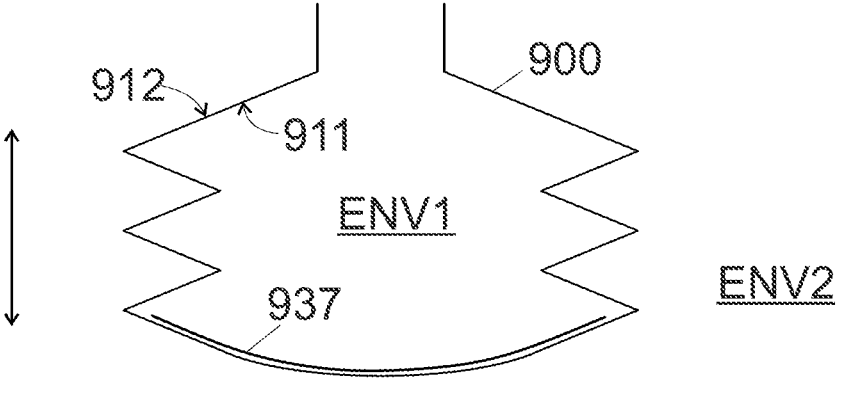
FIG. 3 illustrates a pressurizable container.

Referring now to FIGS. 2a and 2b, an inner tyre 200 is another example of a pneumatic tyre. An inner tyre 200 comprises a valve 220 for filling the inner tyre 200. FIG. 2b is a perspective view of an inner tyre 200, while FIG. 2a shows half of a cross section of an inner tyre 200. The whole inner tyre 200 may be made of the rubber-based material comprising HTC-lignin. In such a case, the rubber-based material of the inner tyre 200 has been cured. Optionally, the inner side of the inner tyre may be provided with a thin coating 237 (see FIG. 2c). What has been said about the thickness of the coating applies. E.g. a self-sealing material may serve as the coating 237. Other types of coating are also possible.

In use, a first side 211 (i.e. an inner side) of the inner tyre 200 is exposed to a first environment ENV1 as depicted in FIG. 2a. The second side 212 (i.e. an outer side) of the inner tyre is exposed to a second environment ENV2. Typically, the second side 212 is in contact with an outer tyre.

Even if not shown in FIG. 2a or 2b, an inner tyre 200 may comprise an innerliner 131 such that the innerliner, or a coating thereof, forms the inner side 211 of the inner tyre 200. In such a case, the innerliner 131 of the inner tyre 200 comprises the rubber-based material comprising HTC-lignin. Moreover, the rest of the inner tyre 200 needs not, but may, comprise rubber-based material comprising HTC-lignin. When the inner tyre 200 comprises an innerliner 131, the rest of the inner tyre 200 may comprise second material, e.g. second rubber-based material, that is different from the first rubber-based material of the innerliner of the inner tyre.

Even if not shown in FIG. 2a or 2b an inner tyre 200 may be provided with self-sealant material 136. In such a case, the self-sealant material 136 of the inner tyre 200 may comprise the rubber-based material comprising HTC-lignin. Moreover, the rest of the inner tyre 200 needs not, but may, comprise rubber-based material comprising HTC-lignin. An inner tyre 200 may comprise both an innerliner 131 and self-sealant material 136. As detailed above, at least a part of the first side 111, 211 of the pneumatic tyre 100, 200 is formed of the rubber-based material comprising HTC-lignin. Preferably, the whole inner surface (i.e. the first side 111, 211) of the pneumatic tyre 100, 200 is formed of one or more rubber-based materials comprising HTC-lignin. The outer surface (i.e. the second side 112, 212) of the pneumatic tyre 100, 200, or a part of the outer surface, may be formed of a second material, e.g. second rubber-based material.

The capability of the HTC-lignin to decrease fluid permeability applies also more generally, as will be detailed below in the context of FIGS. 3 and 4b. Therefore, in another example, at least a part of the article (e.g. 900, 300) comprises the first rubber-based material that is configured to restrict fluid permeability and that comprises lignin that has been treated by hydrothermal carbonization such that the first rubber-based material, or a coating (937, 337) thereof, forms at least a part of the first side (e.g. 911, 311). The first side is, in use, configured to be exposed to a higher pressure than the second side (e.g. 912, 312). A thickness of the coating (337, 937) that separates the first rubber based material from the first environment ENV1 may be e.g. at most 5 mm, at most 1 mm, or at most 500 µm.

Figure 4A:
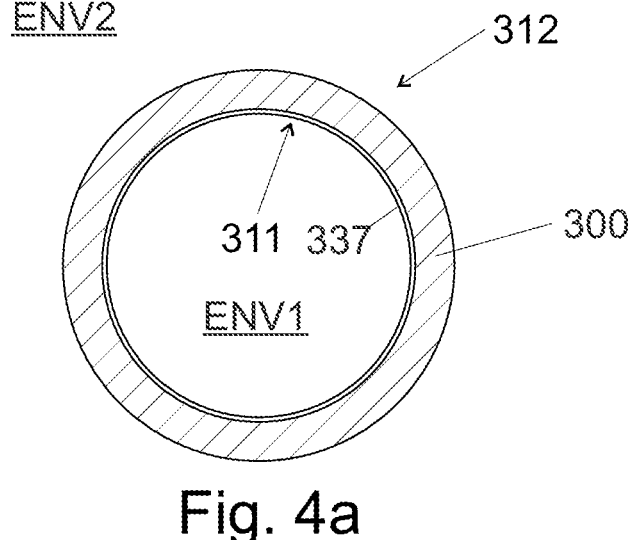
FIG. 4a illustrates a cross section of a tube, an inner side of the tube comprising rubber-based material comprising HTC-lignin.
Figure 4B:
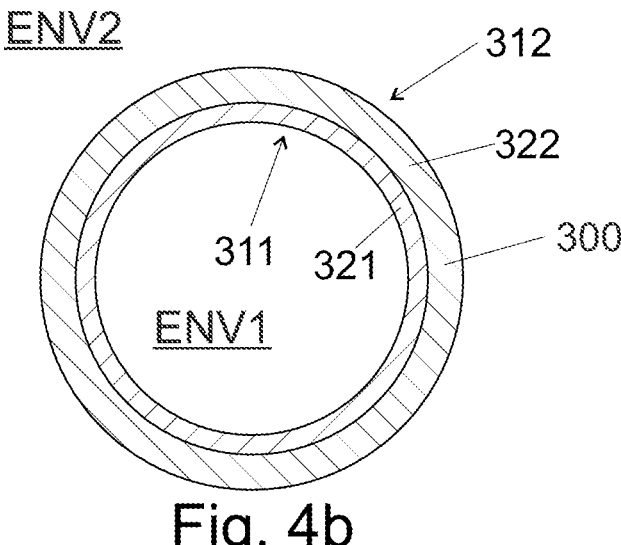
FIG. 4b illustrates a cross section of a tube, an inner side of the tube being provided with a material comprising rubber-based material comprising HTC-lignin.

Referring more specifically to FIG. 4b, also in that embodiment, at least a part of the article 300 comprises second material such that the second material forms at least a part of the second side 312 of the article, and the second material is different from the first rubber-based material. In particular, a composition of the second material is different from a composition of the first rubber-based material. The second material may be a rubber-based material. The second material may be a rubber-based material comprising suitable filler, such as carbon black, silica, and/or HTC-lignin.

FIG. 3 shows schematic side view of a general container 900. As indicated by the arrow, the container 900 is configured to expand and contract, depending on the pressure difference between the environment ENV1 inside the container and the environment ENV2 outside the container. The container 900 comprises a first side 911 and a second side 912. The first side is, in use, configured to be exposed to a first environment ENV1 and the second side is, in use, configured to be exposed to a second environment ENV2. Moreover, the first side is, in use, configured to be exposed to a higher pressure than the second side. The container 900 comprises the first rubber-based material that is configured to restrict fluid permeability. In particular, at least a part of the container 900 comprises the first rubber-based material such that the first rubber-based material, or a coating thereof, forms at least a part of the first side 911. The container may comprise also a second rubber-based material. However, the container 900 may consist of the first rubber-based material. Thus, the container 900 may be made from one material, i.e. the rubber-based material comprising HTC-lignin, throughout.

FIG. 4a shows a cross section of a tube 300. Herein the term "tube" refers to a more or less rigid tubular object having a certain length, typically being longer than a diameter of the tube, and thus relates also to pipes and hoses. A tube 300 may be used as a part of a pipeline. In FIG. 4a, the tube 300 comprises a first side 311 and a second side 312. In use, the first side 311 is exposed to the first environment ENV1 and the second side 312 is exposed to the second environment. In FIG. 3a, the first side 311 is an inner side of the tube 300. Tubes are typically intended to be used in such a way that a pressure inside the tube 300 exceeds a pressure outside of the tube 300. However, this is not necessarily so, whereby the outer surface of the tube 300 may form the first side of the tube 300 in the aforementioned meaning (not shown in Figs).

Referring to FIG. 4a, the tube 300 may be made from one material, i.e. the rubber-based material comprising HTC-lignin, throughout. Referring to FIG. 4b, the tube 300 may comprise an inner tube 321 and a coaxial outer tube 322. In either case, the tube 300 comprises the rubber-based material comprising HTC-lignin. When the tube 300 comprises the inner and outer tubes 321, 322 and the first environment ENV1 is configured to be inside the tube 300, the inner tube 321 comprises the (first) rubber-based material comprising HTC-lignin. Thus, the (first) rubber-based material comprising HTC-lignin, or a coating 337 thereof, forms at least a part of the first side 311. The outer tube 322 may comprise the second material, e.g. the second rubber-based material, such that the second material forms at least a part of the second side 312. The second material may be used e.g. for reinforcing the tube 300. What has been said about the thickness of the coating, applies.

A tube 300 may be used for conveying e.g. water, air, liquid petroleum gas, or nitrogen. The outer side of the tube is typically exposed to regular atmosphere (i.e. air at the pressure of 1 atm), while other uses are also possible. A pressure difference between the first and second environments depends on the intended use. E.g. in water tubes, a pressure difference may be e.g. at least 1 bar. This applies also when pressurized air is being conveyed in the tube 300. E.g. in liquid petroleum gas tubes, a pressure difference of at least 15 mbar may be sufficient.

Figure 4C:
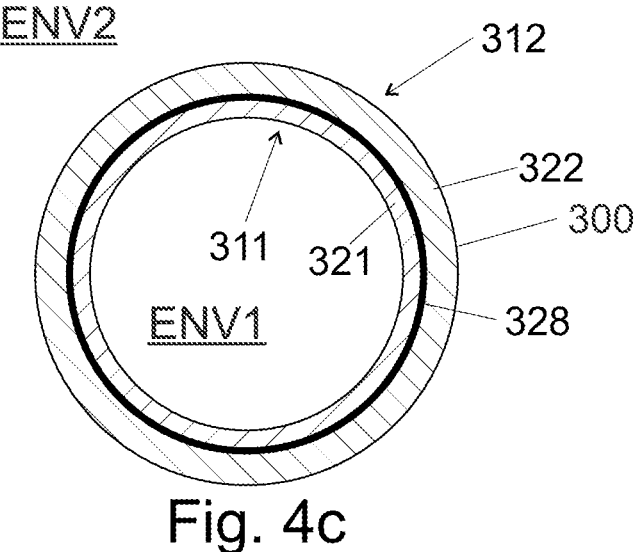
FIG. 4c illustrates a cross section of a tube, an inner side of the tube comprising rubber-based material comprising HTC-lignin, the tube provided with reinforcing material.

The article, such as the tube 300, may comprise reinforcing material 328 (FIG. 4c). A purpose of the material may be to reinforce the tube for withstanding the pressure difference. The reinforcing material may be fibrous. Preferably, the reinforcing material is arranged such that at least some of the rubber-based material that comprises lignin that has been treated by hydrothermal carbonization is arranged between the first side 311 (e.g. an inner side) of the article (e.g. the tube 300) and the reinforcing material. As the reinforcing material e.g. a fibrous material, a textile, or a metal may be used. The article may comprise reinforcing material 328, even if it does not comprise the second material 322 of FIG. 4c.

Figure 5A:
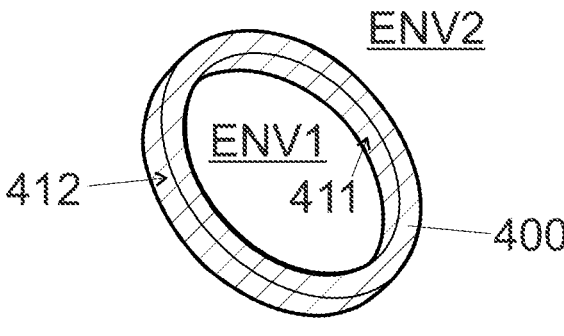
FIG. 5a illustrates a sealing ring, both an inner side and an outer side of the sealing ring comprising rubber-based material comprising HTC-lignin, an inner side of the sealing ring being configured to be exposed, in use, to a higher pressure than an outer side of the sealing ring.
Figure 5B:
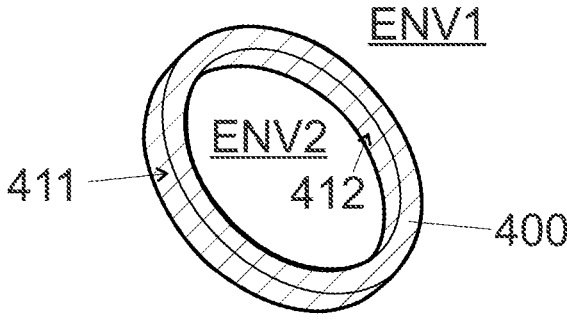
FIG. 5b illustrates a sealing ring, both an inner side and an outer side of the sealing ring comprising rubber-based material comprising HTC-lignin, an outer side of the sealing ring being configured to be exposed, in use, to a higher pressure than an inner side of the sealing ring.

Referring to FIGS. 5a and 5b, the article may be a sealing ring 400. Herein the term "sealing ring" refers to a more or less rigid tubular object having a certain length, the length typically being much shorter than a diameter of the sealing ring. A sealing ring 400 may be used as a part of a pipeline, e.g. in combination with a tube (or a pipe or a hose). In FIGS. 5a and 5b, the sealing ring 400 comprises a first side 411 and a second side 412. In use, the first side 411 is exposed to the first environment ENV1 and the second side 412 is exposed to the second environment ENV2.

In FIG. 5a, the first side 411 is an inner side of the sealing ring 400. This is the more common use of the sealing ring 400. However, in FIG. 5b, the first side 411 is an outer side of the sealing ring 400. The sealing ring 400 may be made from one material throughout. The sealing ring 400 comprises the rubber-based material comprising HTC-lignin in such a way that the rubber-based material, or a coating thereof (not shown), forms at least a part of the first side 411.

A method for manufacturing the article that is not a pneumatic tyre for a motor vehicle comprises providing rubber-based material comprising lignin that has been treated by hydrothermal carbonization and rubber-based matrix material. Thereafter, the article is formed using the rubber-based material such that the article comprises the first side, the second side, and, optionally, the coating. For a more specific definition of these terms, reference is made to the article as such. As detailed in the context of the article as such, the rubber-based material or a coating of the rubber-based material forms at least a part of the first side.

The rubber-based material may have been cured, i.e. the article may be formed from cured rubber-based material e.g. by cutting and/or gluing. The rubber-based material may be provided in a form of an uncured mixture of the HTC-lignin and the matrix material. The rubber-based material may be provided by mixing HTC-lignin and the matrix material. In the latter two cases, the method comprises curing the rubber-based material.

If the method comprises curing the rubber-based material, the rubber-based material at a temperature of 150 to 200° C.

What has been said about the composition of the rubber-based material, in particular the rubber part thereof, applies to the rubber-based matrix material.

As indicated above, the rubber-based material may be manufactured. Thus, an embodiment comprises providing lignin that has been treated by hydrothermal carbonization and rubber-based matrix material. Thereafter, the embodiment comprises mixing the lignin that has been treated by hydrothermal carbonization with the rubber-based matrix material to form a rubber-based material for restricting fluid permeability of the rubber-based material. As detailed above, thereafter the rubber-based material is cured.

In an embodiment, a specific surface area of the lignin that has been treated by hydrothermal carbonization and that is mixed with the rubber-matrix material is in the range of 7 $m^2/g$ to 150 $m^2/g$, when measured according to ASTM D-6556-10. In an embodiment, an oil absorption number of the lignin that has been treated by hydrothermal carbonization and that is mixed with the rubber-matrix material is the range of 50 ml/100 g to 130 ml/100 g, when measured according to ASTM D2414-09. As an alternative to mixing, rubber-based material may be received in the cured or uncured form. These preferable properties of the HTC-lignin apply also in such a case.

An embodiment comprises providing the rubber-based material with a coating such that the coating forms at least a part of the first side of the article. What has been said about the thickness of the coating in the context of the article, applies.

Figure 6A:
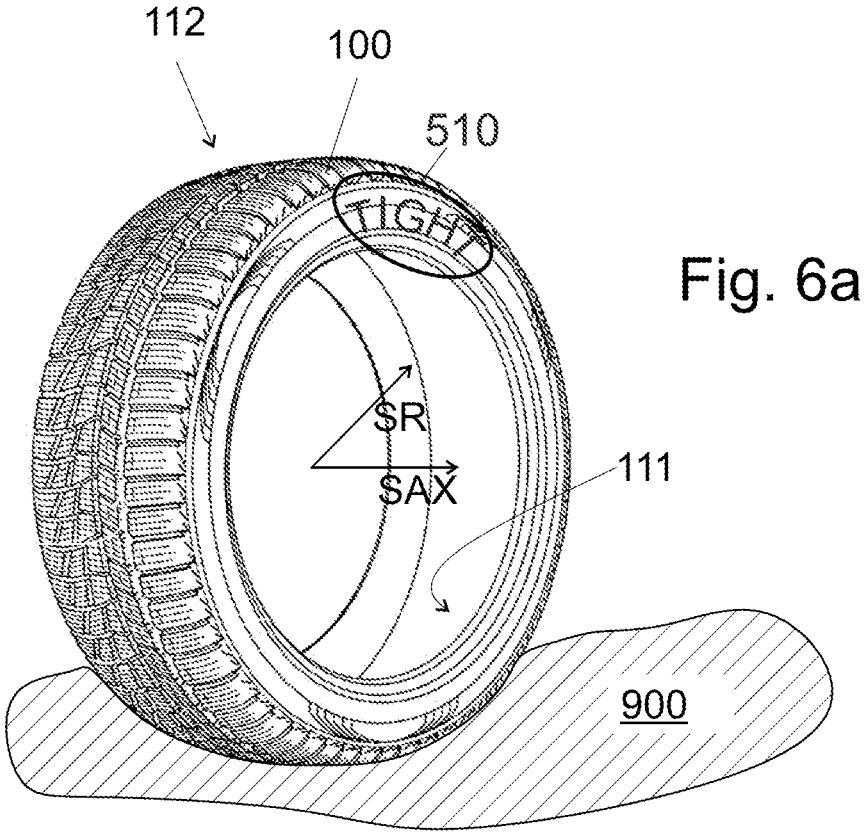
FIG. 6a shows a pneumatic tyre comprising an information carrier indicative of fluid tightness of the tyre.
Figure 6B:
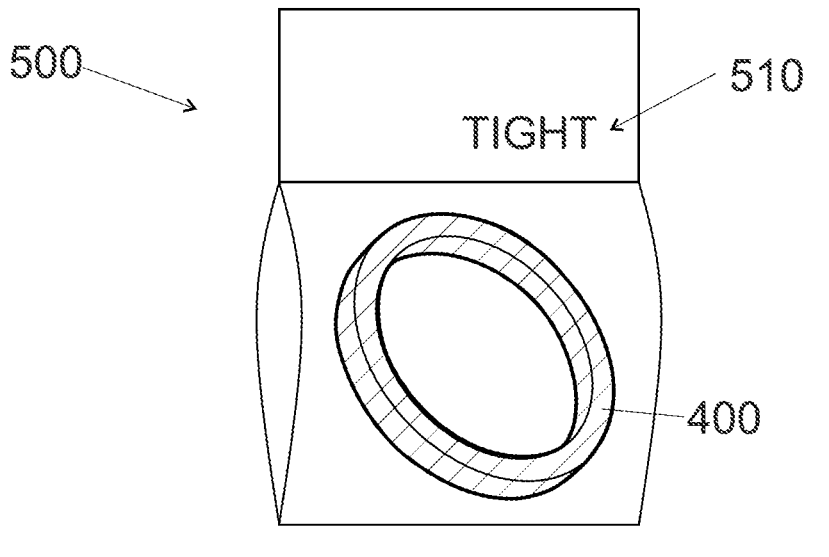
FIG. 6b shows a package comprising a sealing ring, the package comprising an information carrier indicative of fluid tightness of the sealing ring.

As indicated above, the HTC-lignin improves fluid tightness of the articles including pneumatic tyres. This property may be important for a person seeking such articles or tyres. Therefore, it is beneficial to provide the person with information indicative of the article (100, 200, 300, 400, 900) having reduced fluid permeability or reduced gas permeability. Referring to FIGS. 6a and 6b, such information may be provided with an information carrier 510. As indicated in FIG. 6a, the item may comprise an information carrier 510 (i.e. a first information carrier) that carries first information ("TIGHT") that is indicative of the tyre 100 or other article 400 having low fluid permeability. The information carrier may e.g. be a marking on the tyre 100 or the other article, e.g. container 900 or tube 300. This applies also to other types of articles. In the alternative, e.g. when the article, such as a sealing ring 400, does not comprise sufficient space for an information carrier, as e.g. in FIG. 6b, an arrangement 500 may comprise the information carrier 510 and the article 400. The arrangement 500 may be e.g. a bag, a box, or a pouch comprising a label, wherein the label forms the information carrier 510.

Figure 7A:
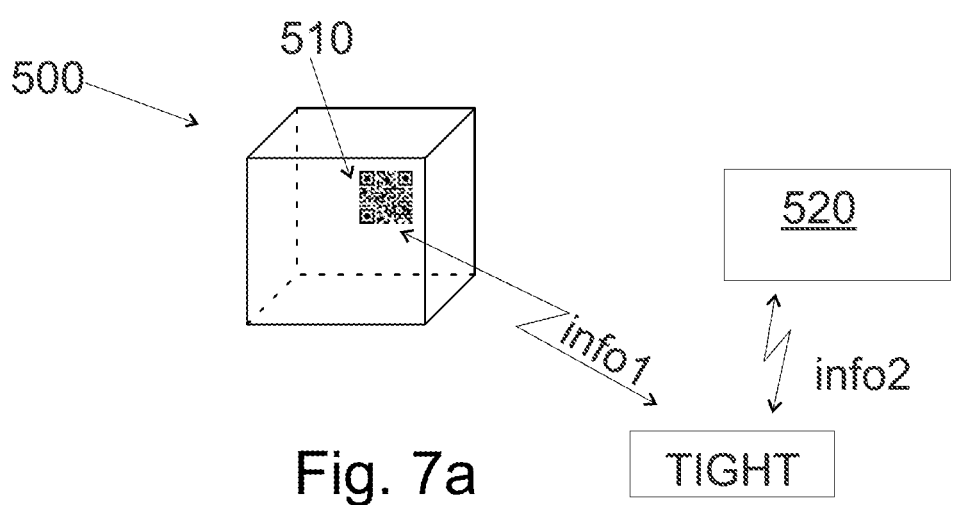
FIG. 7a shows a package comprising an article or articles, the package comprising an information carrier indicative of primary information that is, in combination with secondary information, indicative of fluid tightness of the article or articles of the package.
Figure 7B:
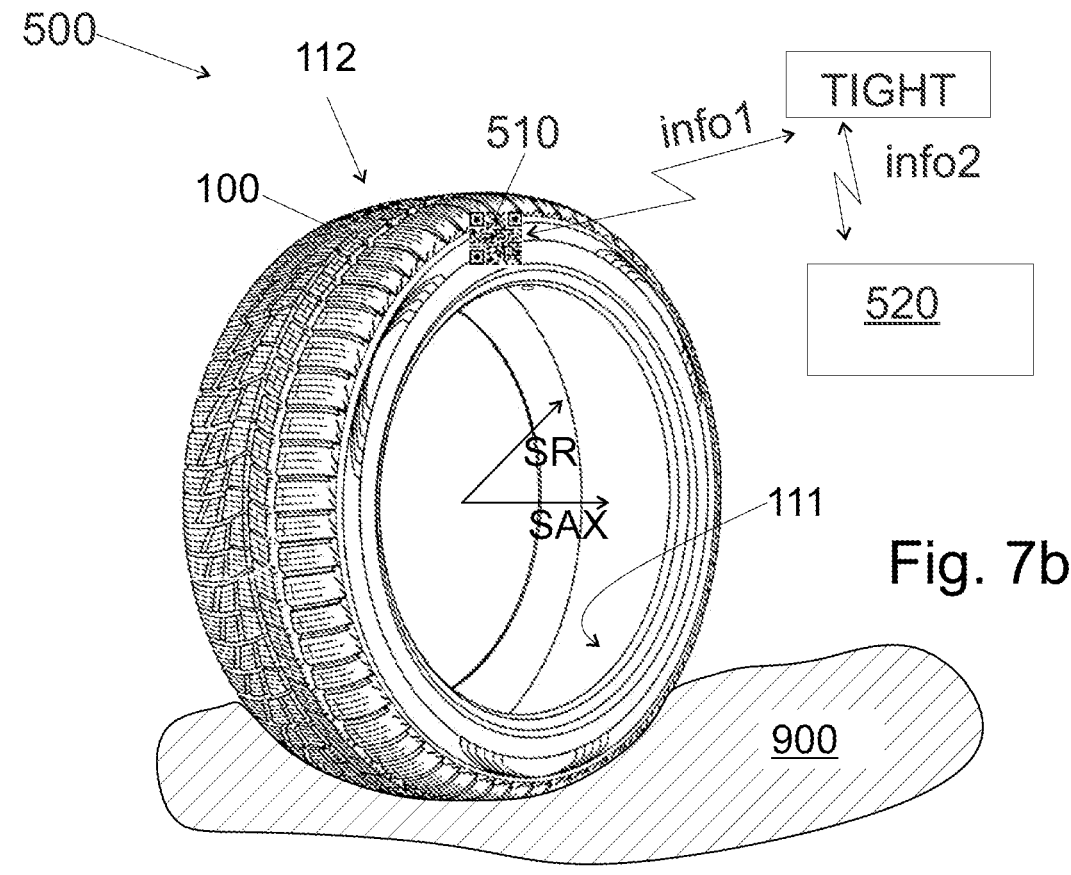
FIG. 7b shows a pneumatic tyre comprising an information carrier indicative of primary information that is, in combination with secondary information, indicative of fluid tightness of the tyre.

The information carrier 510 needs not carry information that is indicative of the article 100 having low fluid permeability. Referring to FIGS. 7a and 7b, instead, the information carrier 510 may carry first information ("info1"), that is, in combination with some second information ("info2"), indicative of the article 100 having low fluid permeability. The second information may be stored e.g. in a database 520. The first information ("info1") may comprise e.g. a serial number of the article or a model number of the article. A serial number identifies an article, and a model number identifies a group of substantially similar articles. Then the second information may be accessed with the serial number or the model number to obtain information indicative of the article having low fluid permeability, As a third alternative, the database 520 may comprise information indicative of the article having a low fluid permeability. Thus, the information carrier 510 is not needed. Thus, the information on reduced fluid permeability of the article can be found from the database e.g. by using a color and shape of the article.

The information carrier 510 may be e.g. a marking (e.g. text, a barcode or a 2D barcode, such as QR-code), an RFID circuit, or an electric circuit. The database 520 (if any) may be comprised by the article, or the database may be located in a different place.

Thus, in an embodiment, the pneumatic tyre (100, 200) or the other article (300, 400, 900) comprises at least one of (i) an information carrier 510 carrying first information and (ii) a database 520 comprising second information, wherein the first information and/or the second information is indicative of the article having low fluid permeability.

An embodiment of an arrangement 500 comprises the article (100, 200, 300, 400, 900), and the arrangement 500 comprises at least one of (i) an information carrier 510 carrying first information and (ii) a database 520 comprising second information, wherein the first information and/or the second information is indicative of the pneumatic tyre (100, 200) or the other article (300, 400, 900) having low fluid permeability.

In the context of tyres, the first information and/or the second information, in combination, may be indicative of the pneumatic tyre (100, 200) having low gas permeability.

As for the term "lignin that has been treated by hydrothermal carbonization" (i.e. HTC-lignin), this involves two aspects: lignin and hydrothermal carbonization.

Concerning the former (i.e. lignin), lignin is renewable and environmentally sustainable raw material that is comprised by many plants, including trees, which further to lignin comprise cellulose and hemicellulose. Black liquor is an example of a material that comprises lignin but is substantially free from cellulose and hemicellulose. Black liquor is a major by-product of pulp and paper industry. Paper is manufactured from softwood and hardwood, which contain significant amounts of lignin; and the process of papermaking separates cellulose and hemicellulose from the wood, while the lignin dissolves in the chemicals thereby forming spent liquor. A typical example of lignin containing material is spent liquor from biomass fractionation, such as pulp mill black liquor. The term "black liquor" refers to spent liquor of a Kraft pulp process, i.e. a sulphate process. Spent liquor of a sulphite process also comprises lignin, but that liquor is commonly called "brown liquor". However, the sulphite process does not dissolve lignin to the same extent as the sulphate process. Lignin can be extracted from the liquor e.g. by precipitation. Hereinabove the term "lignin" in the term HTC-lignin refers to lignin that has been extracted from biomass-based material. More preferably, the term "lignin" in the term HTC-lignin refers to lignin that has been extracted, e.g. precipitated, from a spent liquor of a Kraft process or a sulphite pulp process. Lignin needs not be pure lignin. However, typically extraction of lignin includes washing steps of precipitated lignin. Lignin in native form has very high molecular weight. The molecular structure of lignin comprises phenylpropane ($C_9$) units, which are connected to each other, typically via carbon-carbon (C—C) and/or ether (C—O—C) linkages.

Lignin in general contains relatively high amounts of functional groups. Lignin contains functional groups, which may participate in chemical reactions and form chemical bonds. Functional groups typically present in lignin comprise, for example, carbonyl groups, aliphatic hydroxyl groups and phenolic hydroxyl groups. Functional groups of lignin are detectable even after a chemical pulping process, in black liquor. The further processing of lignin containing material, particularly of lignin originating from wood, therefore is environmental and cost-effective way of providing lignin derivatives with functional properties. As indicated above, at least some of the functional group of lignin remain in the HTC-lignin.

Concerning the latter (i.e. hydrothermal carbonization), a hydrothermal carbonization treatment (i.e. a HTC treatment) of lignin refers to a thermochemical conversion process of lignin in an aqueous suspension. Hydrothermal carbonization treatment of lignin produces lignin derivatives having high carbon content and functional groups. In particular, the hydrothermal carbonization treatment (i.e. a HTC treatment) of lignin refers to a thermochemical conversion process of the lignin as defined above in an aqueous suspension at elevated pressure and temperature, typically in a reactor suitable for the purpose. In the treatment, a pressure in the reactor may be in the range of 10 to 40 bar, preferably equal to or higher than 15 bar. A temperature in the reactor may be from 150° C. to 300° C., such as in the range of 150° C. to 250° C. The temperature equals the temperature of the aqueous lignin suspension inside the reactor during the hydrothermal carbonization treatment (i.e. HTC treatment). The hydrothermal carbonization may further comprise at least partial refining of the carbonized lignin. Typically, the carbonized lignin may be at least partially charred. Hydrothermal carbonization treatment of lignin has the effect of increasing the carbon content of lignin containing material. HTC lignin has a high carbon content, typically 40 wt. % or more, such as in the range of 40 to 65 wt. %, or even higher.

As discussed above, it has now been found that lignin that has been treated by hydrothermal carbonization (i.e. HTC-lignin) improves fluid tightness (i.e. reduces fluid permeability) of a rubber-based matrix material. To this end, the HTC-lignin may be mixed with rubber-based matrix material to form a mixture, the mixture being hereinabove and hereinbelow referred to as the "rubber-based material", which thus comprises at least HTC-lignin. As it comprises HTC-lignin, the rubber-based material is configured to restrict fluid permeability. In particular, the rubber-based material is applied in such a part of the article 100, 200, 300, 400, 900 that in the article 100, 200, 300, 400, 900, the rubber-based material is configured to restrict fluid permeability. In addition to the HTC-lignin, some filler material may be added to the rubber-based matrix material. Such fillers include carbon black and silica.

After mixing, the rubber-based material may be subjected to curing (i.e. hardening). Thus, after curing, the rubber-based material may cured, at least to some extent. However, in certain applications, such as when used as self-sealant, the rubber-based material need not be cured. Moreover, the curing may be done only partially, whereby the rubber-based material may be only partially cured. However, in an embodiment, the rubber-based material of the article 100, 200, 300, 400, 900 has been cured. Curing may be a vulcanization process, wherein the uncured material is heated in a temperature typically less than 200° C., such as in the range of 150 to 200° C. During the curing reaction, rubber-based components undergo cross-linking reactions. The formed cross-linked structure bonds the tyre components firmly together. The duration of the curing may vary depending on the side of the article. Passenger car tyres are typically cured from few minutes up to half an hour, while curing of heavy tyres may take several hours.

As indicated above, the hydrothermal carbonization treatment of lignin has the effect of fragmenting the lignin molecular structure. Moreover, it has been observed that the HTC-lignin has the effect of reducing air permeability of rubber. Examples showing this for a wide range of rubber material will be given below. The specific surface area of HTC-lignin may be in the range of 7 m²/g to 150 m²/g, when measured according to ASTM D-6556-10. More specifically, these values relate to the specific surface area of the material after the hydrothermal carbonization treatment of lignin and before the HTC-lignin is mixed with the rubber-based matrix material. Another property of the HTC-lignin that may affect binding with the matrix rubber material, and in this way also air tightness, is an oil absorption number. In an embodiment, an oil absorption number of HTC lignin is the range of 50 ml/100 g to 130 ml/100 g, when measured according to ASTM D2414-09. More specifically, these values relate to the specific surface area of the material after the hydrothermal carbonization treatment of lignin and before the HTC-lignin is mixed with matrix rubber.

The rubber-based matrix material may be one of, or comprise at least one of: natural rubber, styrene-butadiene rubber, nitrile-butadiene tuber, nitrile rubber, chloroprene rubber, ethylene propylene diene rubber, and butyl rubber, such as halobutyl rubber. Thus, in an embodiment, the rubber-based material comprises, in addition to the HTC lignin, at least one of: natural rubber, styrene-butadiene rubber, nitrile-butadiene tuber, nitrile rubber, chloroprene rubber, ethylene propylene diene rubber, and butyl rubber, such as halobutyl rubber.

As detailed below, the HTC-lignin functions particularly well with Nitrile Butadiene Rubber (NBR), Chloroprene Rubber (CR), Ethylene Propylene Diene Monomer rubber (EPDM), Natural Rubber (NR), and Butyl Rubber (BR), in particular bromobutyl rubber (BIIR).

Thus, preferably, the rubber-based material comprises HTC-lignin and at least one of Nitrile Butadiene Rubber (NBR), Chloroprene Rubber (CR), Ethylene Propylene Diene Monomer rubber (EPDM), Natural Rubber (NR), and Butyl Rubber (BR).

When the HTC-lignin is applied to an innerliner of a pneumatic tyre, the innerliner preferably comprises butyl rubber (optionally at least partly halogenated). The innerliner may further comprise natural rubber.

Butyl rubber may be halogenated or non-halogenated. Herein the term "halobutyl rubber" refers to halogenated butyl rubber. When partially halogenated, the butyl rubber comprises both a halogenated butyl rubber compound and a non-halogenated butyl rubber compound. Examples of halobutyl rubber include chlorobutyl rubber and bromobutyl rubber.

Preferably, an innerliner of a pneumatic tyre comprises at least partly halogenated butyl rubber, such as bromobutyl rubber, and HTC-lignin.

The rubber matrix material for other applications may be selected according to needs.

Experimental

After the initial observation that HTC-lignin decreases air permeability in certain rubber materials, a series of tests were conducted. To this end, the effect of replacing a part or all of a conventional filler material (Carbon black N550) with HTC-lignin on air permeability of four rubber materials (A, B, C, D) suitable for various rubber articles, was tested. The materials were A: Nitrile Butadiene Rubber (NBR), B: Chloroprene Rubber (CR), C: Ethylene Propylene Diene Monomer rubber (EPDM), and D: Natural Rubber (NR); reference is made to Tables 1a, 1b, 2a, and 2b These materials are typically not used as rubber material for an innerliner of a pneumatic tyre. In contrast, these samples represent general technical rubber goods. However, butyl rubber, in particular halobutyl rubber, such as bromobutyl rubber, which is shown in Tables 3 and 4, can be used as material for general technical rubber goods. Thus, even if BIIR is shown as an example of tyre material, the same material can be used for other purposes as well.

As a reference for the materials A, B, C, and D, only carbon black N550 was used as filler. The samples contained 60 phr filler. These references are shown below in Tables 1a and 1b Aa, Ba, Ca, and Da, respectively. To test the effect of HTC-lignin either ⅔ (i.e. 40 phr) or all of the filler material was replaced with HTC lignin. The former are shown below by the references Ab, Bb, Cb, and Db, respectively. The latter are shown below by references Ac, Bc, Cc, and Dc, respectively.

TABLE 1a composition of samples Aa, Ab, Ac, Ba, Bb, and Bc

| | HTC lignin w % | | | | | |
| | Aa | 22 w % Ab | 34 w % Ac | Ba | 22% Bb | 34 w % Bc |
|---|---|---|---|---|---|---|
| NBR (Medium ACN) | 100 | 100 | 100 | | | |
| CR | | | | 100 | 100 | 100 |
| MgO | | | | 4 | 4 | 4 |
| ZnO | 5 | 5 | 5 | 5 | 5 | 5 |
| Stearic acid | 1.5 | 1.5 | 1.5 | 0.5 | 0.5 | 0.5 |
| 6PPD | 0.5 | 0.5 | 0.5 | 0.5 | 0.5 | 0.5 |
| TMQ | 1.5 | 1.5 | 1.5 | 1.5 | 1.5 | 1.5 |
| Carbon Black N550 | 60 | 20 | | 60 | 20 | |
| HTC lignin | | 40 | 60 | | 40 | 60 |
| TDAE -oil | 7 | 7 | 7 | 7 | 7 | 7 |
| DPG | | | | 1 | 1 | 1 |
| MBTS | 1 | 1 | 1 | | | |
| TMTD | 1 | 1 | 1 | 1 | 1 | 1 |
| Sulphur | 1 | 1 | 1 | 1.5 | 1.5 | 1.5 |

TABLE 1b composition of samples Ca, Cb, Cc, Da, Db, and Dc

| | HTC lignin w % | | | | | |
| | Ca | 22 w % Cb | 34 w % Cc | Da | 22 w % Db | 34 w % Dc |
|---|---|---|---|---|---|---|
| EPDM | 100 | 100 | 100 | | | |
| NR | | | | 100 | 100 | 100 |
| ZnO | 5 | 5 | 5 | 5 | 5 | 5 |
| Stearic acid | 1.5 | 1.5 | 1.5 | 1.5 | 1.5 | 1.5 |
| 6PPD | 0.5 | 0.5 | 0.5 | 0.5 | 0.5 | 0.5 |
| TMQ | 1.5 | 1.5 | 1.5 | 1.5 | 1.5 | 1.5 |
| Carbon Black N550 | 60 | 20 | | 60 | 20 | |
| HTC lignin | | 40 | 60 | | 40 | 60 |
| TDAE -oil | 7 | 7 | 7 | 7 | 7 | 7 |
| MBTS | 1.5 | 1.5 | 1.5 | 1.2 | 1.2 | 1.2 |
| TMTD | 1 | 1 | 1 | | | |
| ZBEC | 2.5 | 2.5 | 2.5 | | | |
| Sulphur | 2 | 2 | 2 | 2.6 | 2.6 | 2.6 |

The terms in tables 1a and 1b are as follows:
NBR—Nitrile butadiene rubber
ACN—Acrylonitrile
CR—Chloroprene rubber
EPDM—Ethylene Propylene Diene Monomer rubber
NR—Natural Rubber (NR)
MgO—Magnesium oxide
ZnO—Zinc oxide
Stearic acid—Stearic acid
6PPD—N-(1,3-dimethylbutyl)-N"-phenyl-1,4-benzene-
    diamine; an organic chemical used as an antiozonant in
    rubber compounds TMQ—2 2,4-trimethyl-1,2-dihydroquinoline; a rubber antioxidant Carbon black N550—Carbon black, wherein the first digit indicates a particle size of 40 to 48 nm HTC lignin—hydrothermally carbonized lignin TDAE-oil—treated distillate aromatic extracted oil DPG—a rubber accelerator (diphenyl guanidine)

MBTS—a rubber accelerator (Mercaptobenzothiazole)

TMTD—a rubber accelerator, (Tetramethylthiuram Disulfide)

ZBEC—a rubber accelerator (Zinc dithiocarbamate)

Sulphur—Sulphur

The rubber compositions A, B, C, D (all versions a, b, and c) were mixed using a Brabender mixer. The formed rubber compositions were thereafter vulcanized. Vulcanization temperature was 160° C. for compositions A, B, C (all versions a, b, and c) and 150° C. for composition D (all versions a, b, and c).

After manufacturing the samples of Tables 1a and 1b, their air permeability was tested according to the standard ASTM D 3985-2017. The instrument Mocon OX-TRAN 2/61 was used for the purpose. Test temperature was 23° C. The results are shown in Tables 2a and 2b.

TABLE 2a

| Air permeability of samples A and B (a to c) | | | | | | |
|---|---|---|---|---|---|---|
| | Aa | Ab | Ac | Ba | Bb | Bc |
| Air permeability, (cc · mm/(m² · day) | 97 | 60 | 60 | 129 | 94 | 73 |
| Decrement (%) | | 38 | 38 | | 27 | 43 |

TABLE 2b

| Air permeability of samples A and B (a to c) | | | | | | |
|---|---|---|---|---|---|---|
| | Ca | Cb | Cc | Da | Db | Dc |
| Air permeability, (cc · mm/(m² · day) | 876 | 784 | 721 | 889 | 835 | 806 |
| Decrement (%) | | 11 | 18 | | 6 | 9 |

Tables 2a and 2b show the air permeability in units of cc·mm/(m²·day). Herein the unit cc refers to cubic centimetre at measurement conditions, i.e. temperature 23° C. and pressure 1 atm, which at the time of measurement was 760 mmHg. Furthermore, the tables show the decrement (in percentages) of the air permeability of the sample, as compared to the reference sample without any HTC-lignin. Thus, the "A" samples are compared to the sample "Aa", the "B" samples to "Ba", etc.

As shown by the results, replacing some or all of the carbon black of the rubber decreases air permeability in all these cases. Replacing ⅔ of the carbon black with HTC-lignin implies a HTC-lignin content of 22 w % (see Tables 1a and 1 b). Replacing all of the carbon black with HTC-lignin implies a HTC-lignin content of 34 w % (see Tables 1a and 1b). Thus, it seems that in order to improve the air tightness, the HTC-lignin content may be e.g. up to 40 w %, such as up to 35 w %. As for the effect at a lower end, the authors are confident that improved air tightness (reduced permeability) are observable at a HTC-lignin content of at least 8 w %, such as at least 10 w %. Thus, it sees that a suitable range for the content of HTC-lignin with these rubbers is from 8 w % to 40 w %, such as from 10 w % to 35 w %. It may be that already a lower HTC-lignin content, such as at least 3 w %, improves air tightness.

As shown in Tables 2a and 2b, by replacing carbon black with HTC-lignin, the air permeability decreased up to 43% (sample Bc compared to Ba; chloroprene rubber). Very good results were obtained also for nitrile butadiene rubber (material A), wherein the air permeability decreased by 38%. As also readable from table 1a, the air permeability of nitrile butadiene rubber (material A) and chloroprene rubber (material B) even without the HTC-lignin is below 200 cc·mm/ (m²·day). A piece of material having an absolute air permeability below 200 cc/(m²·day) is reasonably commonly considered as a level required for materials referred to as "air tight". In these experiments, a thickness of the sample was 2 mm (2±0.2 mm). As also readable from tables 1a and 1b, the air permeability precisely these materials could be lowered a lot by using HTC-lignin. Thus, particularly these materials seem attractive for applications requiring air tightness of the material.

As indicated above, the materials A-D represent materials of general technical rubber goods. To test the effect of HTC-lignin in conventional tyre innerliner rubber, similar test were carried out for bromobutyl rubber (BIIR), hereinafter denoted by material E. A filler used in the BIIR was Carbon black N660. In the experiments, a part or all of the carbon black was replaced by HTC-lignin. The samples contained 60 phr filler. A reference sample is shown below in Table 3 as Ea, and it contains only carbon black as filler. To test the effect of HTC-lignin, 5 phr, 40 phr, or all of the filler material was replaced with HTC lignin. These are shown in Table 3 as Es, Eb, and Ec, respectively.

TABLE 3

| composition of samples Ea, Es, Eb, and Ec representing tyre innerliner rubber | | | |
|---|---|---|---|
| | HTC lignin w % | | |
| | 0% Ea | 3% Es | 22 w % Eb | 34 w % Ec |
| BIIR | 100 | 100 | 100 | 100 |
| Carbon black N660 | 60 | 55 | 20 | |
| HTC lignin | | 5 | 40 | 60 |
| TDAE oil | 8 | 8 | 8 | 8 |
| Aromatic & aliphatic hydrocarbon resin blend | 7 | 7 | 7 | 7 |
| Phenolic tackifying resin | 4 | 4 | 4 | 4 |
| Magnesium oxide | 0.15 | 0.15 | 0.15 | 0.15 |
| Stearic acid | 2 | 2 | 2 | 2 |
| Zinc oxide | 1 | 1 | 1 | 1 |
| Sulphur | 0.5 | 0.5 | 0.5 | 0.5 |
| MBTS | 1.5 | 1.5 | 1.5 | 1.5 |

The acronyms in table 3 are as follows:

BIIR—Bromobutyl rubber

Carbon black N660—Carbon black, wherein the first digit indicates a particle size of 49 to 60 nm HTC lignin—hydrothermally carbonized lignin TDAE-oil—treated distillate aromatic extracted oil MBTS—a rubber accelerator, (Mercaptobenzothiazole)

As readable from Tables 3 and 1, the effect of a small amount of HTC-lignin for only BIIR is shown. Unfortunately, for reasons of shortage of HTC-lignin, extensive tests could not be performed.

The rubber compositions E (all versions a, b, and c) were mixed using a Brabender mixer. The formed rubber composition were thereafter vulcanized. Vulcanization temperature was 180° C.

After manufacturing the samples of Table 3, their air permeability was tested according to the standard ASTM D 3985-2017. The instrument Mocon OX-TRAN 2/61 was used for the purpose. Test temperature was 23° C. The results are shown in Table 4.

TABLE 4

| Air permeability of tyre innerliner compound | | | | |
| --- | --- | --- | --- | --- |
| | Ea | Es | Eb | Ec |
| Air permeability, (cc · mm/(m² · day) | 75 | 70 | 42 | 21 |
| Decrement (%) | | 7 | 44 | 72 |

As shown by the results, replacing some or all of the carbon black of the rubber decreases air permeability of also bromobutyl rubber. Replacing 5 phr of the carbon black with HTC-lignin implies a HTC-lignin content of 3 w % (see Table 3) Replacing all of the carbon black with HTC-lignin implies a HTC-lignin content of 34 w % (see Table 3). Thus, it seems that in order to improve the air tightness, the HTC-lignin content may be e.g. up to 40 w %, such as up to 35 w %. As for the effect at a lower end, for bromobutyl rubber it seems that beneficial effects are seen already for a very low content of HTC-lignin, such as 3 w %. Thus, it seems that a suitable range for the content of HTC-lignin with butyl rubber (in particular halobutyl rubber, such as bromobutyl rubber) is from 3 w % to 40 w %, such as from 8 w % to 35 w %.

As shown in Table 4, by replacing carbon black with HTC-lignin, the air permeability decreased up to 72%. Moreover, the air permeability of BIIR is low even without using HTC-lignin, which is a reason, by BIIR is commonly used for tyre innerliner material.

While preparing the samples, the inventors also noted that characteristic values of the mixing process do not significantly change. Table 5 shows four characteristic mixing values for the bromobutyl rubber shown in Table 3.

TABLE 5

| Characteristic mixing values for the bromobutyl rubber. | | | | |
| --- | --- | --- | --- | --- |
| | Ea | Es | Eb | Ec |
| Fmin | 1.2 | 1.2 | 1.2 | 1.2 |
| Fmax | 4.6 | 4.6 | 4.6 | 4.5 |
| T 10 | 1.1 | 1.2 | 1.3 | 1.3 |
| T 90 | 3.9 | 6.7 | 8.9 | 8.6 |

The values of Table 5 are measured according to the standard ASTM D5289, they indicate vulcanization rate and ratio.

The values given in Table 5 are:

Fmin—Minimum value of torque, dNm (i.e. deci Newton metres),

Fmax—Maximum value of torque, dNm,

T 10—time to 10% of maximum torque (Fmax), minutes,

T 90—time to 90% of maximum torque (Fmax), minutes.

As seen from table 5, the forces needed to cure the mixture, as indicated by the value Fmax, remain at the same level even if some of the carbon black is replaced by HTC-lignin. This implies that the rubber vulcanizes to substantially the same level irrespective of the amount of HTC-lignin. This indicates that some elastic properties of the cured rubber do not change by replacing the filler material with HTC-lignin. However, a longer time for vulcanization may be required, as indicated by the time T 90. A longer T 90 time may be due to the functional groups of the lignin which stabilized radicals and that way slow down vulcanization reactions.

Particularly in applications, where rubber-material is used for improving air tightness, such as in tyres, application of HTC-lignin may involve significant savings. For example, if a purpose of an innerliner is to achieve a certain level of air tightness, the same level can be obtained by using HTC-lignin as a filler material, and, at the same time, decreasing the thickness of the innerliner. In this way, less innerliner material is needed in the tyres.

Moreover, replacing carbon black with HTC-lignin does not increases costs, because of the market price of HTC-lignin. Finally, HTC-lignin is a renewable material, and replacing some fossil filler material with HTC-lignin is beneficial for environmental reasons, too.

The following examples illustrate a method for manufacturing a pneumatic tire.

101. A method for manufacturing a pneumatic tyre for a motor vehicle, the method comprising arranging a rubber-based component onto a building drum to form a tubular preform for the pneumatic tyre for a motor vehicle, expanding the tubular preform to form a carcass of the pneumatic tyre, arranging a metal component and a textile component onto the carcass, thereby manufacturing a preform of the pneumatic tyre, curing the preform of a pneumatic tyre, thereby bonding the components together by means of curing, receiving rubber-based material that has been formed by mixing lignin that has been treated by hydrothermal carbonization and rubber-based matrix material for restricting gas permeability of the rubber-based material, and

[A]

arranging the rubber-based material onto the building drum before said expanding the tubular preform to form a carcass of the pneumatic tyre, and/or

[B]

arranging the rubber-based material onto an inner surface of the carcass.

102. The method of example 101 comprising curing the preform of the pneumatic tyre at a temperature of 150° C. to 200° C.

103. The method of example 101 or 102, comprising arranging the rubber-based material onto an inner surface of the carcass before said curing, during said curing, and/or after said curing.

104. The method of any of the examples 101 to 103, comprising receiving or forming an innerliner comprising the rubber-based material and

[A]

arranging the innerliner onto the building drum before said expanding the tubular preform to form a carcass of the pneumatic tyre or

[B]

arranging the innerliner onto an inner surface of the carcass.

105. The method of any of the example 101 to 104, wherein the rubber-based material or the innerliner of example 104 comprises butyl rubber, optionally, the rubber-based material or the innerliner of example 104 comprises natural rubber and butyl rubber.

106. The method of example 105, wherein the rubber-based material or the innerliner of example 104 comprises non-halogenated butyl rubber, the rubber-based material or the innerliner of example 104 comprises non-halogenated butyl rubber and halogenated butyl rubber, or the rubber-based material or the innerliner of example 104 comprises non-halogenated butyl rubber and does not comprise halogenated butyl rubber.

107. The method of any of the examples 101 to 105, wherein the rubber-based material or the innerliner of example 104 comprises halobutyl rubber, e.g. at least one of chlorobutyl rubber and bromobutyl rubber.

108. The method of example 107, wherein the rubber-based material or the innerliner of example 104 comprises halogenated butyl rubber and non-halogenated butyl rubber, or the rubber-based material or the innerliner of example 104 comprises halogenated butyl rubber and does not comprise non-halogenated butyl rubber.

109. The method of any of the examples 101 to 108, comprising applying the rubber-based material onto the inner surface of the carcass after said curing for using the rubber-based material as a self-sealant.

110. The method of any of the examples 101 to 109, comprising providing the lignin that has been treated by hydrothermal carbonization, providing the rubber-based matrix material, and forming the rubber-based material by mixing the lignin that has been treated by hydrothermal carbonization with the rubber-based matrix material for restricting gas permeability of the rubber-based material.

111. The method of any of the examples 101 to 110, wherein a specific surface area of the lignin that has been treated by hydrothermal carbonization is in the range of 7 $m^2/g$ to 150 $m^2/g$, when measured according to ASTM D-6556-10.

112. The method of any of the examples 101 to 111, wherein an oil absorption number of the lignin that has been treated by hydrothermal carbonization is the range of 50 ml/100 g to 130 ml/100 g, when measured according to ASTM D2414-09.

113. The method of any of the examples 101 to 112, comprising arranging the rubber-based material onto the building drum before said expanding the tubular preform to form a carcass of the pneumatic tyre such that the rubber-based material forms a radially innermost layer of the materials arranged on the building drum.

The following examples illustrate manufacturing an article other than a pneumatic tire.

201. A method for manufacturing an article that is not pneumatic tyre for a motor vehicle and that is suitable for use as at least a part of a pressurizable container or pipeline, the method comprising providing rubber-based material comprising lignin that has been treated by hydrothermal carbonization and rubber-based matrix material, forming the article, which is not pneumatic tyre for a motor vehicle, using the rubber-based material such that the article comprises a first side that is, in use, configured to be exposed to a first environment, and a second side that is, in use, configured to be exposed to a second environment, which in use of the article, has a lower pressure than the first environment, such that the rubber-based material or a coating of the rubber-based material forms at least a part of the first side.

202. The method of example 201 comprising curing the rubber-based material at a temperature of 150° C. to 200° C.

203. The method of the example 201 or 202, wherein the rubber-based matrix material comprises at least one of natural rubber, styrene-butadiene rubber, nitrile-butadiene rubber, nitrile rubber, chloroprene rubber, ethylene propylene diene rubber, and butyl rubber, such as halobutyl rubber;

preferably, the rubber-based matrix material comprises at least one of nitrile butadiene rubber, chloroprene rubber, ethylene propylene diene monomer rubber, natural rubber, and butyl rubber;

more preferably, the rubber-based matrix material comprises at least one of nitrile butadiene rubber, and chloroprene rubber, and butyl rubber.

204. The method of any of the examples 201 to 203, wherein the rubber-based material comprises butyl rubber, optionally, the rubber-based material comprises natural rubber and butyl rubber.

205. The method of example 204, wherein the rubber-based material comprises non-halogenated butyl rubber, the rubber-based material comprises non-halogenated butyl rubber and halogenated butyl rubber, or the rubber-based material comprises non-halogenated butyl rubber and does not comprise halogenated butyl rubber.

206. The method of any of the examples 201 to 204, wherein the rubber-based material comprises halobutyl rubber, e.g. at least one of chlorobutyl rubber and bromobutyl rubber.

207. The method of example 206, wherein the rubber-based material comprises halogenated butyl rubber and non-halogenated butyl rubber, or the rubber-based material comprises halogenated butyl rubber and does not comprise non-halogenated butyl rubber.

208. The method of any of the examples 201 to 207, comprising providing lignin that has been treated by hydrothermal carbonization and rubber-based matrix material, and mixing the lignin that has been treated by hydrothermal carbonization and the rubber-based matrix material to form a rubber-based material for restricting fluid permeability of the rubber-based material.

209. The method of any of the examples 201 to 208, wherein a specific surface area of the lignin that has been treated by hydrothermal carbonization is in the range of 7 $m^2/g$ to 150 $m^2/g$, when measured according to ASTM D-6556-10.

210. The method of any of the examples 201 to 209, wherein an oil absorption number of the lignin that has been treated by hydrothermal carbonization is the range of 50 ml/100 g to 130 ml/100 g, when measured according to ASTM D2414-09.

211. The method of any of the examples 201 to 210, comprising providing the rubber-based material with a coating such that the coating forms at least a part of the first side of the article, wherein a thickness of the coating it at most 5 mm;

preferably, a thickness of the coating it at most 500 μm.

212. The method of any of the examples 201 to 211, comprising forming the article such that the rubber-based material forms at least a part of the first side of the article.

The following examples indicate how HTC-lignin can be employed in a pneumatic tyre.

1. A pneumatic tyre for a motor vehicle, the pneumatic tyre comprising rubber-based material that is configured to restrict gas permeability and that comprises lignin that has been treated by hydrothermal carbonization, a first side that is an inner side of the pneumatic tyre, and an opposite second side, such that the rubber-based material or a coating of the rubber-based material forms at least a part of the first side of the pneumatic tyre.

2. The pneumatic tyre of the example 1, wherein the rubber-based material has been cured.

3. The pneumatic tyre of example 1 or 2,

[A]

wherein the rubber-based material forms at least a part of the first side of the pneumatic tyre and/or

[B]

the pneumatic tire comprises a coating of the rubber-based material, the coating forming at least a part of the first side of the pneumatic tyre, and a thickness of the coating is at most 4 cm;

preferably, a thickness of the coating is at most 5 mm or at most 500 μm.

4. The pneumatic tyre of any of the examples 1 to 3, wherein the rubber-based material comprises butyl rubber, optionally, the rubber-based material comprises natural rubber and butyl rubber.

5. The pneumatic tyre of example 4, wherein the rubber-based material comprises non-halogenated butyl rubber, the rubber-based material comprises non-halogenated butyl rubber and halogenated butyl rubber, or the rubber-based material comprises non-halogenated butyl rubber and does not comprise halogenated butyl rubber.

6. The pneumatic tyre of the examples 1 to 4, wherein the rubber-based material comprises halobutyl rubber, e.g. at least one of chlorobutyl rubber and bromobutyl rubber.

7. The pneumatic tyre of example 6, wherein the rubber-based material comprises halogenated butyl rubber and non-halogenated butyl rubber, or the rubber-based material comprises halogenated butyl rubber and does not comprise non-halogenated butyl rubber.

8. The pneumatic tyre of any of the examples 1 to 7, wherein the rubber-based material comprises at least 3 wt % lignin that has been treated by hydrothermal carbonization;

preferably, the rubber-based material comprises at least 8 wt % lignin that has been treated by hydrothermal carbonization.

9. The pneumatic tyre of any of the examples 1 to 8, wherein the rubber-based material comprises at most 40 wt % lignin that has been treated by hydrothermal carbonization;

preferably, the rubber-based material comprises at most 35 wt % lignin that has been treated by hydrothermal carbonization.

10. The pneumatic tyre of any of the examples 1 to 9, wherein the rubber-based material has been manufactured by mixing with a rubber based matrix material HTC-lignin of which specific surface area is from 7 $m^2/g$ to 150 $m^2/g$, when measured according to ASTM D-6556-10 and/or the HTC-lignin that is mixed with the rubber based matrix material has an oil absorption number of from 50 ml/100 g to 130 ml/100 g.

11. The pneumatic tyre of any of the examples 1 to 10, comprising second material such that the second material forms a tread of the pneumatic tyre, and the second material is a rubber-based material and different from the rubber-based material configured to restrict gas permeability.

12. The pneumatic tyre of any of the examples 1 to 11, comprising reinforcing material such that at least some of the rubber-based material that comprises lignin that has been treated by hydrothermal carbonization is arranged between the inner side of the pneumatic tyre and the reinforcing material;

preferably, the reinforcing material comprises fibrous material, textile, or metal.

13. The pneumatic tyre of any of the examples 1 to 12, comprising an innerliner, wherein the innerliner comprises the rubber-based material;

optionally, the pneumatic tyre comprises tyre inside paint and/or self-sealant material and/or noise cancelling foam arranged to form at least a part of the first side.

14. The pneumatic tyre of the example 13, comprising self-sealant material, wherein the self-sealant material forms at least a part of the first side and the self-sealant material comprises third material that is rubber-based and comprises lignin that has been treated by hydrothermal carbonization.

15. The pneumatic tyre of any of the examples 1 to 14, comprising self-sealant material, wherein
the self-sealant material forms at least a part of the first side and
the self-sealant material comprises the rubber-based material.

16. The pneumatic tyre of any of the examples 1 to 15 or an arrangement comprising the pneumatic tyre of any of the examples 1 to 15, the pneumatic tyre or the arrangement comprising
at least one of an information carrier carrying first information and a database comprising second information, wherein
the first information and/or the second information is indicative of the pneumatic tyre having low gas permeability.

The invention claimed is:

1. A tube for use as at least a part of a pipeline, the tube comprising:
a rubber-based material that is configured to restrict fluid permeability and that comprises lignin that has been treated by hydrothermal carbonization,
a second material,
a first side configured to be exposed to a first environment, and
a second side configured to be exposed to a second environment, such that:
the rubber-based material or a coating of the rubber-based material forms at least a part of the first side,
the second material forms at least a part of the second side, and
the first side is configured to be exposed to a higher pressure than the second side, wherein:
the rubber-based material comprises at least one of natural rubber, styrene-butadiene rubber, nitrile-butadiene rubber, nitrile rubber, chloroprene rubber, and ethylene propylene diene rubber;
the rubber-based material comprises 8 wt % to 35 wt % lignin treated by hydrothermal carbonization;
the rubber-based material comprises a cured material;
a composition of the second material is different from a composition of the rubber-based material configured to restrict fluid permeability;
the tube is longer than a diameter of the tube; and
the first side of the tube is an inner side of the tube.

2. The tube of claim 1,
wherein the rubber-based material forms at least a part of the first side and/or
the tube comprises a coating of the rubber-based material, the coating forming at least a part of the first side of the tube, and
a thickness of the coating is at most 5 mm.

3. The tube of claim 1, wherein
the rubber-based material forms at least a part of the first side of the tube.

4. The tube of claim 1, wherein
the rubber-based material comprises at least one of nitrile butadiene rubber, chloroprene rubber, ethylene propylene diene monomer rubber, and natural rubber.

5. The tube of claim 1, wherein
the rubber-based material comprises a rubber-based matrix material and HTC-lignin of which specific surface area is from 7 m²/g to 150 m²/g, when measured according to ASTM D-6556-10 and/or
the rubber-based material comprises a rubber-based matrix material and HTC-lignin having an oil absorption number of from 50 ml/100 g to 130 ml/100 g.

6. The tube of claim 1, comprising
a reinforcing material such that at least some of the rubber-based material that comprises lignin that has been treated by hydrothermal carbonization is arranged between the first side of the tube and the reinforcing material.

7. The tube of claim 1, comprising
an information carrier carrying first information, wherein the first information is indicative of fluid permeability of the tube.

8. The tube of claim 1, wherein the rubber-based material forms at least a part of the first side; and/or
the tube comprises a coating of the rubber-based material, the coating forming at least a part of the first side of the tube, and
a thickness of the coating is at most 500 μm.

9. The tube of claim 1, wherein the rubber-based material comprises at least one of nitrile butadiene rubber, and chloroprene rubber.

10. The tube of claim 1, wherein the second material is a rubber-based material.

11. The tube of claim 6, wherein the reinforcing material comprises fibrous material, textile, or metal.

12. The tube of claim 1, comprising an inner tube and a coaxial outer tube.

13. The tube of claim 1, comprising:
an inner tube and a coaxial outer tube,
wherein the inner tube comprises the rubber-based material configured to restrict fluid permeability.

14. The tube of claim 1, wherein the rubber-based material comprises lignin that has been extracted from a spent liquor of a Kraft process and has been treated by hydrothermal carbonization.

15. The tube of claim 4, wherein the rubber-based material comprises lignin that has been extracted from a spent liquor of a Kraft process and has been treated by hydrothermal carbonization.

16. The tube of claim 9, wherein the rubber-based material comprises lignin that has been extracted from a spent liquor of a Kraft process and has been treated by hydrothermal carbonization.

* * * * *